(12) United States Patent
Sato et al.

(10) Patent No.: US 10,543,541 B2
(45) Date of Patent: Jan. 28, 2020

(54) HELICAL BROACH AND INTERNAL GEAR MACHINING METHOD USING THE SAME

(71) Applicant: NACHI-FUJIKOSHI CORP., Minato-ku, Tokyo (JP)

(72) Inventors: Hideki Sato, Toyama (JP); Shota Miura, Toyama (JP); Kazuyuki Nakamura, Toyama (JP); Masayuki Tsuno, Toyama (JP)

(73) Assignee: NACHI-FUJIKOSHI CORP., Minato-ku, Tokyo (JP)

( * ) Notice: Subject to any disclaimer, the term of this patent is extended or adjusted under 35 U.S.C. 154(b) by 35 days.

(21) Appl. No.: 15/904,507

(22) Filed: Feb. 26, 2018

(65) Prior Publication Data

US 2018/0243847 A1   Aug. 30, 2018

(30) Foreign Application Priority Data

Feb. 28, 2017   (JP) ................................. 2017-036138

(51) Int. Cl.

| | |
|---|---|
| *B23F 21/26* | (2006.01) |
| *B23D 43/00* | (2006.01) |
| *B23D 43/06* | (2006.01) |
| *B23D 37/16* | (2006.01) |
| *B23D 43/04* | (2006.01) |

(52) U.S. Cl.
CPC ............ *B23D 43/06* (2013.01); *B23D 37/16* (2013.01); *B23D 43/005* (2013.01); *B23D 43/04* (2013.01); *B23F 21/26* (2013.01)

(58) Field of Classification Search
CPC ............. Y10T 407/16; Y10T 407/1614; Y10T 407/1628; Y10T 407/1642;
(Continued)

(56) References Cited

U.S. PATENT DOCUMENTS 3,267,552 A * 8/1966 Psenka .................... B23F 21/26
                                                        407/18
3,439,398 A * 4/1969 Jacobson ............... B23D 43/02
                                                        407/16

(Continued)

FOREIGN PATENT DOCUMENTS

| DE | 2049868 A1 | * | 7/1971 | ............. B23D 37/16 |
|---|---|---|---|---|
| GB | 1134155 A | * | 11/1968 | ............. B23D 43/02 |
| JP | 2005-144639 A | | 6/2005 | |
| JP | 2007098533 A | * | 4/2007 | |
| JP | 4678746 B2 | | 4/2011 | |

*Primary Examiner* — Nicole N Ramos
(74) *Attorney, Agent, or Firm* — Harness, Dickey & Pierce, P.L.C.

(57) ABSTRACT

A helical broach which eliminates the need for a fixing means for fixing a workpiece during gear machining is provided. The helical broach includes: a plurality of cutting edges; a spiral flute formed between adjacent cutting edges to extend in a spiral manner with a predetermined helix angle with respect to an axial direction of the helical broach; and a gullet formed between adjacent cutting edges to extend with a predetermined helix angle with respect to a circumferential direction of the helical broach. In the helical broach, the expression: $0.5 \leq \tan \beta/\tan(\alpha+\beta) \leq 0.7$ is satisfied, wherein $\beta$ is the helix angle of the spiral flute, and $(90°-\alpha)$ is the helix angle of the gullet with reference to a central axis of the helical broach. An internal gear machining method using the helical broach is also provided.

3 Claims, 9 Drawing Sheets

(58) Field of Classification Search
CPC ......... Y10T 407/1657; Y10T 407/1671; Y10T 407/1685; Y10T 409/40; Y10T 409/4028; B23F 21/24; B23F 21/241; B23F 21/243; B23F 21/245; B23F 21/246; B23F 21/248; B23F 21/26; B23F 21/262; B23F 21/264; B23F 21/266; B23D 43/00; B23D 43/005; B23D 43/02; B23D 43/04; B23D 43/06; B23D 2043/025; B23D 2043/063; B23D 37/00; B23D 37/02; B23D 37/04; B23D 37/08; B23D 37/10; B23D 37/14; B23D 37/16

See application file for complete search history.

(56) References Cited

U.S. PATENT DOCUMENTS

| | | | | |
|---|---|---|---|---|
| 4,274,767 A | * | 6/1981 | Bistrick | B23F 21/26 407/18 |
| 6,527,484 B2 | | 3/2003 | Nakamura et al. | |
| 9,440,298 B2 | * | 9/2016 | Yoshizumi | B23D 43/005 |
| 2002/0015622 A1 | * | 2/2002 | Nakamura | B23D 43/02 407/13 |
| 2011/0020078 A1 | * | 1/2011 | Katsuki | B23D 43/005 407/13 |
| 2011/0195375 A1 | * | 8/2011 | Kuehner | B23D 43/005 433/102 |

* cited by examiner

HELICAL BROACH AND INTERNAL GEAR MACHINING METHOD USING THE SAME

TECHNICAL FIELD

The present invention relates to a helical broach for machining an internal gear and an internal gear machining method using the same.

BACKGROUND ART

In internal gear machining using a general helical broach, an inner side of a fixed workpiece is machined to form a helical gear while rotating a helical broach in a broaching machine. In this process, a force which causes the workpiece to rotate in the same direction as the rotation direction of the helical broach generates in the workpiece.

Therefore, if the workpiece is not fixed to the broaching machine, the workpiece moves (rotates) in a circumferential direction when the helical broach is pulled out through the inner side of the workpiece from an upper side to a lower side. If the workpiece rotates during gear machining, the workpiece is displaced from an original position for machining by the helical broach, and consequently, the internal gear of the workpiece loses shape, so that a desired machining accuracy cannot be obtained.

In order to solve such a problem, a fixing means for fixing a workpiece to the broaching machine has been used to prevent the workpiece from rotating during gear machining. For instance, as a fixing means for fixing a workpiece, there is a device which firmly fixes the workpiece from above or a lateral surface side by providing a spike-shaped rotation stopper on a lower surface side of the workpiece in the broaching machine.

However, there has been a problem that when the spike-shaped rotation stopper is used for a workpiece in gear machining, a machining trace such as a scratch remains on the lower surface of the workpiece. Further, when fixing the workpiece from the upper side or the lateral side, a force for preventing the rotation of the workpiece during machining needs to be individually adjusted depending on the kind of the workpiece because the force varies depending on the material and size of the workpiece.

Therefore, Japanese Patent No. 4678746, U.S. Pat. No. 6,527,484, and JP 2005-144639 A disclose an art in which a rotation stopper for firmly fixing the workpiece to the broaching machine becomes unnecessary by limiting a helix angle of a gullet or a spiral flute in a helical broach to a predetermined range to reduce the force (rotational force) causing the workpiece to rotate (generated in the workpiece) during internal gear machining by the helical broach.

SUMMARY OF THE INVENTION

However, the helical broaches disclosed in Japanese Patent No. 4678746, U.S. Pat. No. 6,527,484, and JP 2005-144639 A can not completely prevent the force (rotational force) which causes the workpiece to rotate, and thus a fixing means for fixing the workpiece during gear machining is needed additionally.

Under these circumstances, an object of the present invention is to provide a helical broach which does not need a fixing means for fixing a workpiece during gear machining, and thus can machine a helical internal gear using an ordinary broaching machine, and an internal gear machining method using the helical broach.

In order to solve the above problem, the present invention provides a helical broach including a plurality of cutting edges, the helical broach further including: a spiral flute formed between adjacent cutting edges to extends with a predetermined helix angle with respect to an axial direction of the helical broach; and a gullet formed between adjacent cutting edges to extend with a predetermined helix angle with respect to a circumferential direction of the helical broach, in which a relational expression: $0.5 \leq \tan \beta / \tan(\alpha + \beta) \leq 0.7$ is satisfied wherein $\beta$ is the helix angle of the spiral flute, and $(90°-\alpha)$ is the helix angle of the gullet with reference to a central axis of the helical broach. Also, the cutting edge of the helical broach may be chamfered in a range of 0.1 to 0.3 mm.

An invention of a method of machining an internal gear using the helical broach of the present invention is an internal gear machining method in which the machining is performed in a state where the helical broach or a part machined by the helical broach is freely rotatable relative to the central axis of the helical broach.

Further, in the invention of an internal gear machining method, in the case where an internal gear is machined using a broaching machine including the helical broach of the present invention, a holder for the helical broach in the broaching machine or a holder for the part machined by the helical broach may be provided with a bearing which receives a thrust load generated in the part.

Effect of the Invention

By using the helical broach of the present invention, an effect of eliminating the need for a fixing means for fixing a workpiece in gear machining is achieved. Further, since a rotational force is not generated in the workpiece during internal gear machining, when machining the workpiece by pulling out the helical broach through the inner side of the workpiece, the workpiece freely rotates in accordance with the motion of the helical broach, thereby forming helical gear machining on the inner side of the workpiece.

Therefore, the helical broach does not need to be pulled out while being rotated by a broaching machine during internal gear machining. That is, the helical broach of the present invention eliminates the need for using a broaching machine for exclusive use, and even when a general broaching machine having no function of rotating a broach is used, the helical internal gear machining can be applied to the inner side of the workpiece.

DESCRIPTION OF THE EMBODIMENTS

Figure 1:
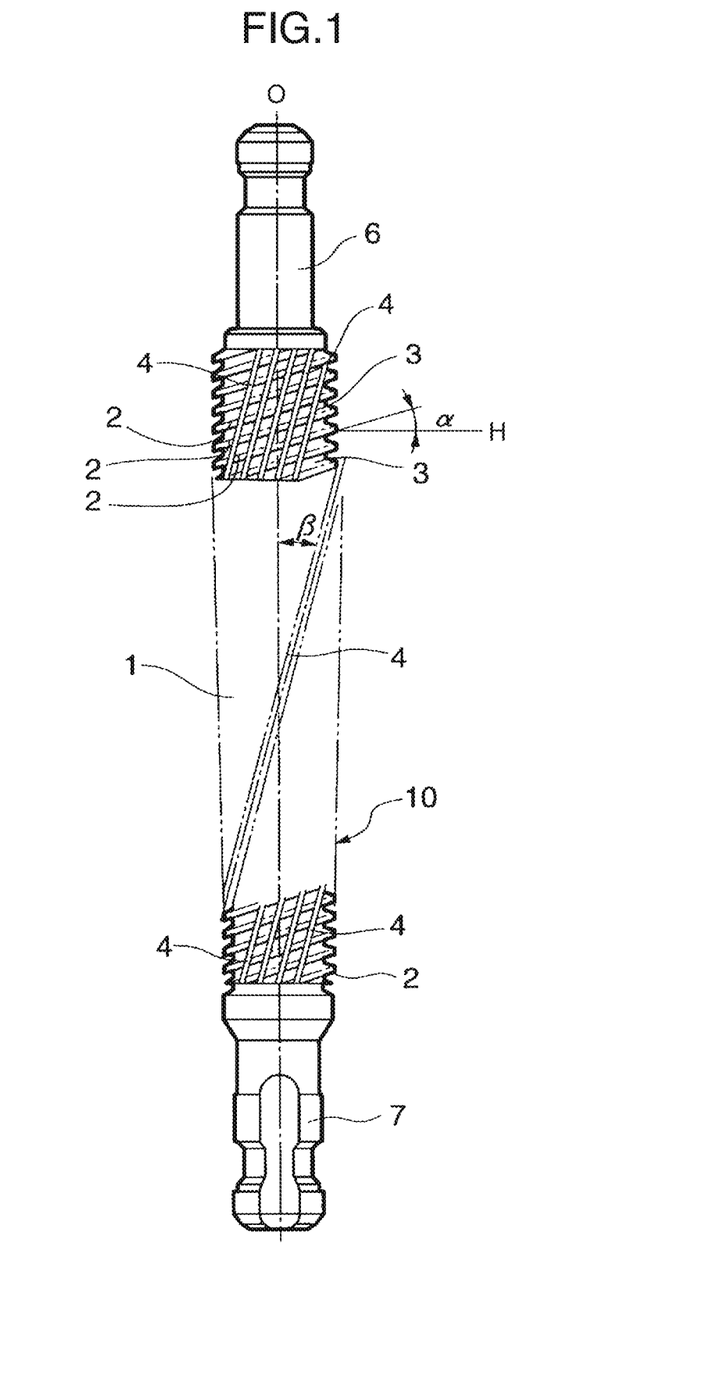
FIG. 1 is a front view of a helical broach 10 of the present invention.

An embodiment for implementing the present invention will be described with reference to the drawings. The front view of a helical broach 10, which is an embodiment of the present invention, is illustrated in FIG. 1. As illustrated in FIG. 1, the helical broach 10 of the present invention generally includes a main body 1 having a large number of cutting edges 2, 2, and grip ends 6, 7 which are shanks for mounting to a broaching machine. A spiral flute 4 inclined by an angle β (helix angle β) with respect to a central axis O of the helical broach 10, and a gullet 3 inclined by an angle α (helix angle α) with respect to a plane H crossing perpendicular to the central axis O are each provided between the cutting edges 2, 2 mainly constituting the main body 1.

Figure 2:
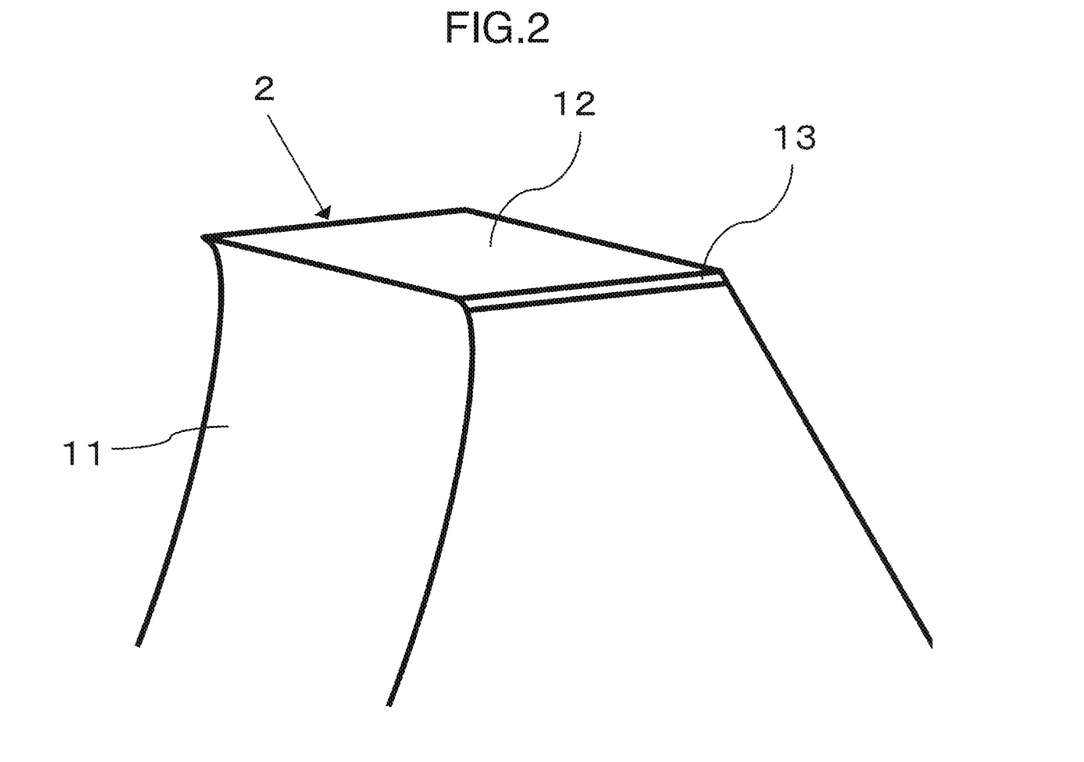
FIG. 2 is a schematic perspective view of a cutting edge 2 constituting the helical broach 10 of the present invention.

Further, as a form of the cutting edge of the helical broach of the present invention, both right and left sides of the cutting edge may be chamfered. FIG. 2 illustrates a schematic perspective view of the cutting edge 2 constituting the helical broach 10 illustrated in FIG. 1. When a chamfer is provided on both sides of the cutting edge 2 illustrated in FIG. 2, the boundary portion (ridge line) between a rake face 11 and a flank (clearance surface) 12 that constitute the cutting edge 2 illustrated in FIG. 2 is a cutting edge portion, and chamfers are provided on both right and left sides of the flank 12.

Figure 3:
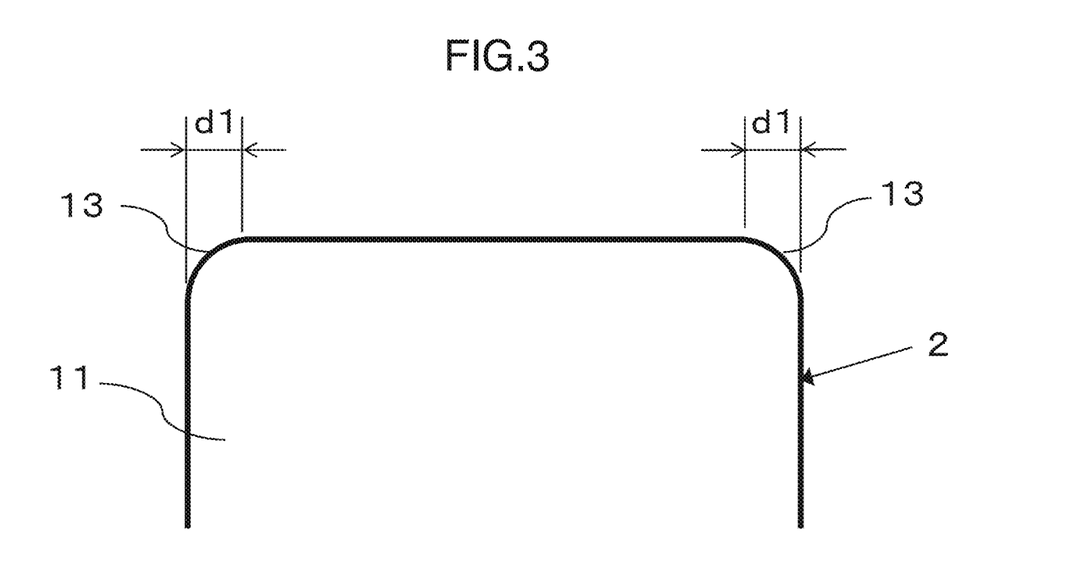
FIG. 3 is a schematic view illustrating a form of an R chamfer seen from a rake face 11 side of the cutting edge 2 shown in FIG. 2.
Figure 4:
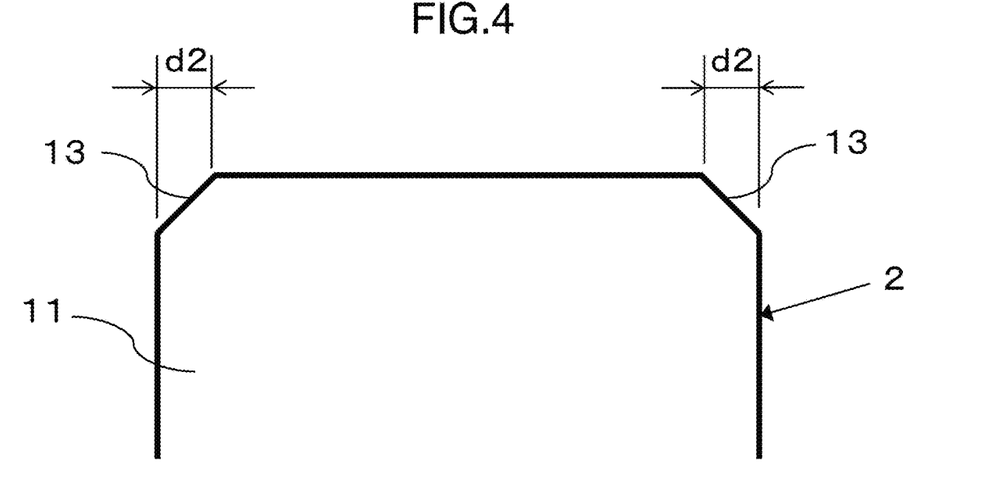
FIG. 4 is a schematic view illustrating a form of a C chamfer seen from a rake face 11 side of the cutting edge 2 shown in FIG. 2.

The forms of the chamfers are categorized mainly into an R chamfer and a C chamfer, and FIGS. 3 and 4 respectively illustrate the form of the R chamfer and the form of the C chamfer seen from the rake face 11 side of the cutting edge 2 illustrated in FIG. 2. When the R chamfers are provided on both right and left sides of the cutting edge 2 with a width (amount of chamfering) d1 as illustrated in FIG. 3, the width (amount of chamfering) d1 is set to a range of 0.1 to 0.3 mm. Further, when the C chamfers are provided on both right and left sides of the cutting edge 2 with a width d2 as illustrated in FIG. 4, the width d2 is set to a range of 0.1 to 0.3 mm.

Figure 5:
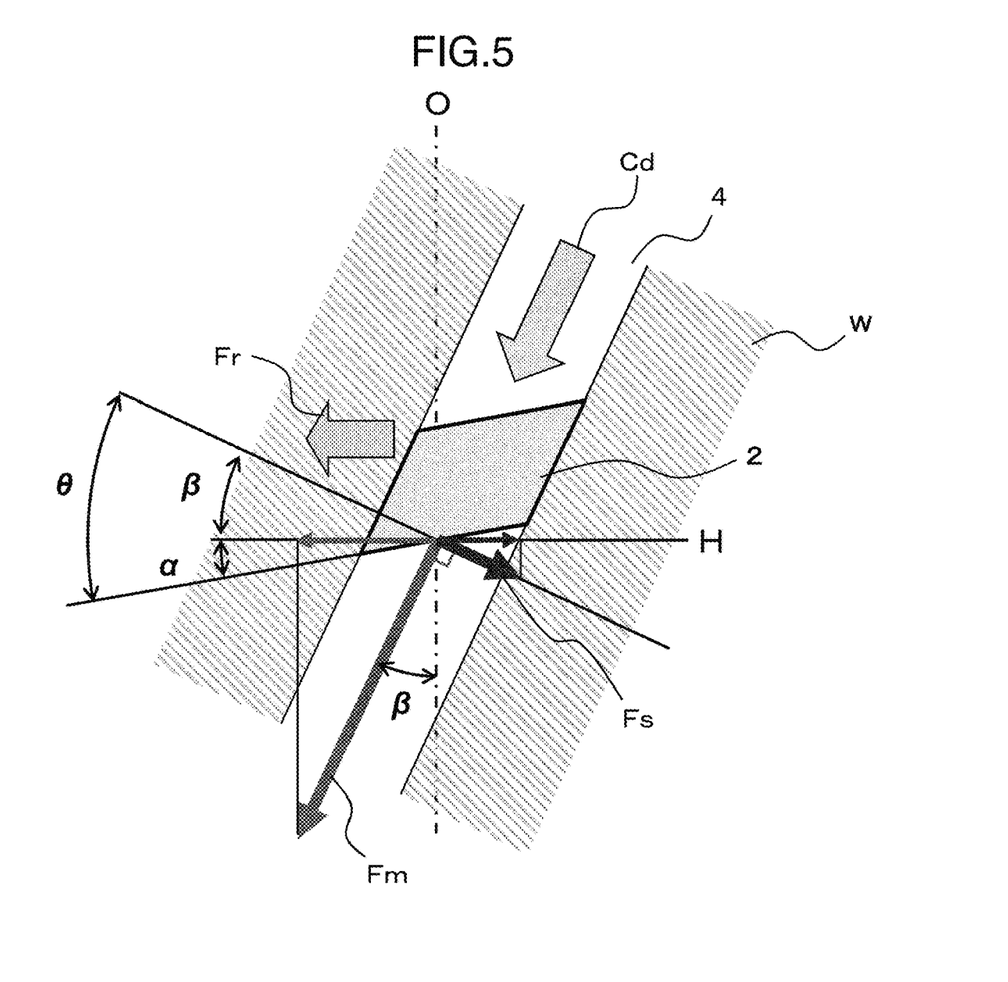
FIG. 5 is a schematic view illustrating a cutting form of the cutting edge 2 of the helical broach 10 of the present invention and a workpiece W during cutting machining.

Next, various types of forces generated in the workpiece W at the time of internal gear machining using the helical broach 10 will be described with reference to the drawings. FIG. 5 depicts a schematic view illustrating various types of forces generated between the cutting edge 2 and the workpiece W during internal gear machining for the workpiece W using the helical broach 10 of the present invention. It is to be noted that FIG. 5 is drawn as a transparent view as seen from the outer side of the workpiece W inwardly to the helical broach 10.

When the helical broach of the present invention is moved in a cutting direction Cd (direction from the upper right to the lower left in FIG. 5) illustrated in FIG. 5, a main force component Fm is generated between the cutting edge 2 of the helical broach and the workpieces W in the same direction as the cutting direction Cd (as viewed from the workpiece side). The main force component Fm forms the angle β with respect to the central axis O of the helical broach. The angle β is the same as the helix angle β of the spiral flute 4 of the cutting edge 2 relative to the central axis O in the helical broach 10 of the present invention illustrated in FIG. 1.

In addition, a transverse force component Fs is generated between the cutting edge 2 of the helical broach and the workpiece W in a perpendicular direction to the cutting direction Cd of the helical broach and in a radial direction (outer circumferential direction) of the helical broach. A force causing the workpiece W to move in the circumferential direction (hereinafter referred to as "rotational force Fr") by these force components Fm, Fs during internal gear machining using the helical broach is expressed based on FIG. 5 as follows.

$$\text{Rotational Force } Fr = \text{Main Force Component } Fm \times \sin\beta - \text{Transverse Force Component } Fs \times \cos\beta \quad (1)$$

The smaller the value of the above "rotational force Fr" is, the less the force for fixing the workpiece to the broaching machine during internal gear machining using the helical broach of the present invention becomes. In particular, when the "rotational force Fr"=0, a new relational expression can be derived from above Expression (1) as follows.

$$\sin\beta/\cos\beta = \tan\beta = \text{Transverse Force Component } Fs/\text{Main Force Component } Fm \quad (2)$$

Specifically, this indicates that the value of the "rotational force Fr" becomes smaller as the value of "transverse force component Fs/main force component Fm" becomes closer to the value of "tan β".

Figure 6:
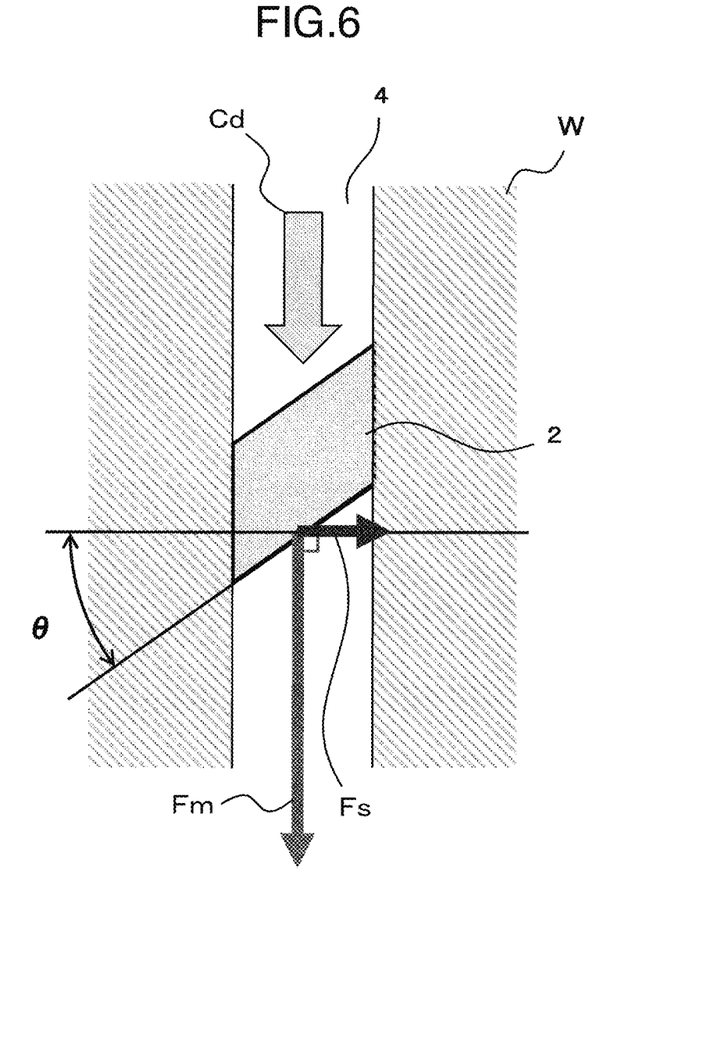
FIG. 6 is a schematic view when the cutting direction of the cutting form shown in FIG. 5 is converted to the vertical direction.

In the present application, the angle represented by angle (α+β) is defined as a new angle θ (=α+β). FIG. 6 illustrates a cutting form when the cutting direction of the cutting form illustrated in FIG. 5 is redrawn into a vertical direction from the upper side to the lower side in the drawing.

Next, the helical broach of the present invention is characterized by that the helical broach satisfies the range of 0.5≤tan β/tan(α+β)≤0.7, where the helix angle of the spiral flute is β, and the helix angle of the gullet is (90°−α) relative to the central axis O. Here, the reason why the value of tan β/tan(α+β) is set less than or equal to 0.7 is that, if the value exceeds 0.7, the rotational force of the workpiece becomes excessively large, so that the tooth form of the workpiece loses shape.

In addition, the reason why the value is set larger than or equal to 0.5 is that, if the value falls below 0.5, the rotational force of the workpiece is generated in the opposite direction.

The larger the value of a is, the smaller the value of tan $\beta/\tan(\alpha+\beta)$ becomes. However, if the value of a is increased, the angle formed by the acute angle lateral face of the cutting edge and the rake face becomes small, so that wear is likely to be accelerated at a corner portion on the acute angle side of the cutting edge.

Therefore, from the viewpoint of preventing wear at the corner portion on the acute angle side of the cutting edge, the value of α is preferably small. More preferably, when the relational expression of $0.5 \le \tan \beta/\tan(\alpha+\beta) \le 0.56$ is satisfied, the rotational force of the workpiece becomes minimum.

For instance, when $\beta=20°$, $\tan \beta=0.364$, and thus in order to satisfy the relational expression of $0.5 \le \tan \beta/\tan(\alpha+\beta) \le 0.7$, the allowable range of the value of α is $7.47 \le \alpha \le 16.05$. Also, in order to satisfy the relational expression of $0.5 \le \tan \beta/\tan(\alpha+\beta) \le 0.56$, the allowable range of the value of α is $13.03 \le \alpha \le 16.05$.

It is to be noted that the values and the numerical value ranges of β which is a value indicating the helix angle of the spiral flute of the helical broach, $(90°-\alpha)$ which is a value indicating the helix angle of the gullet (relative to the central axis O), and $\tan \beta/\tan(\alpha+\beta)$ which is a value indicating a relationship therebetween are obtained by the experimental results described below.

Further, when the angle θ which is the sum of the helix angle α of the gullet and the helix angle β of the spiral flute of the helical broach of the present invention is greater than that of a conventional helical broach, a load concentrates on the corner portion on the acute angle side of the cutting edge during cutting, and therefore the cutting edge tends to be worn. Thus, as a measure against wear of the corner portion on the acute angle side of the cutting edge, it is desirable that chamfer machining with 0.1 to 0.3 mm is applied to the ridge line between the flank of the cutting edge and the lateral face of the cutting edge as described above. This range is selected because when the size of the chamfer is smaller than 0.1 mm, the effect of reducing wear is small, and when the size of the chamfer is larger than 0.3 mm, a sufficient transverse force component (Fs) is not generated, and therefore the rotational force (Fr) does not become 0 (zero).

Furthermore, the fact that the rotational force is 0 (zero) means that a workpiece can be machined in a state where the workpiece is not restrained in the rotational direction. This is a phenomenon which relatively occurs between the broach and the workpiece that are in mutual synchronous rotation during cutting. In other words, when the broach is pulled out without being rotated, the workpiece receives a rotational force along the spiral flute.

That is, the workpiece is set to a freely rotatable state using a member such as a bearing, or the helical broach is set to a freely rotatable state by a bearing or the like, so that the broach is pulled out by giving motion only in the axial direction with the broaching machine. In this manner, the helical broach and the workpiece are in relative motion along the form of the spiral flute, and machining of the internal gear becomes possible. Consequently, synchronous rotation between the helical broach and the workpiece is unnecessary during internal gear machining, and thus helical broach machining becomes possible with a broaching machine which moves only in the axial direction.

In other words, the method of machining an internal gear or a spline using the helical broach of the present invention is a machining method for an internal helical gear or a spline in a state where the helical broach or a part to be machined is freely rotatable relatively to the central axis of the helical broach.

In a machine tool (broaching machine) for machining by a machining method using a helical broach, as an example of the above-described machining method, there is a method of machining an inner helical gear or a spline in a state where a bearing which receives a thrust load is provided in one or both of a holder of the helical broach and a holder of the part to be machined (workpiece).

Figure 7:
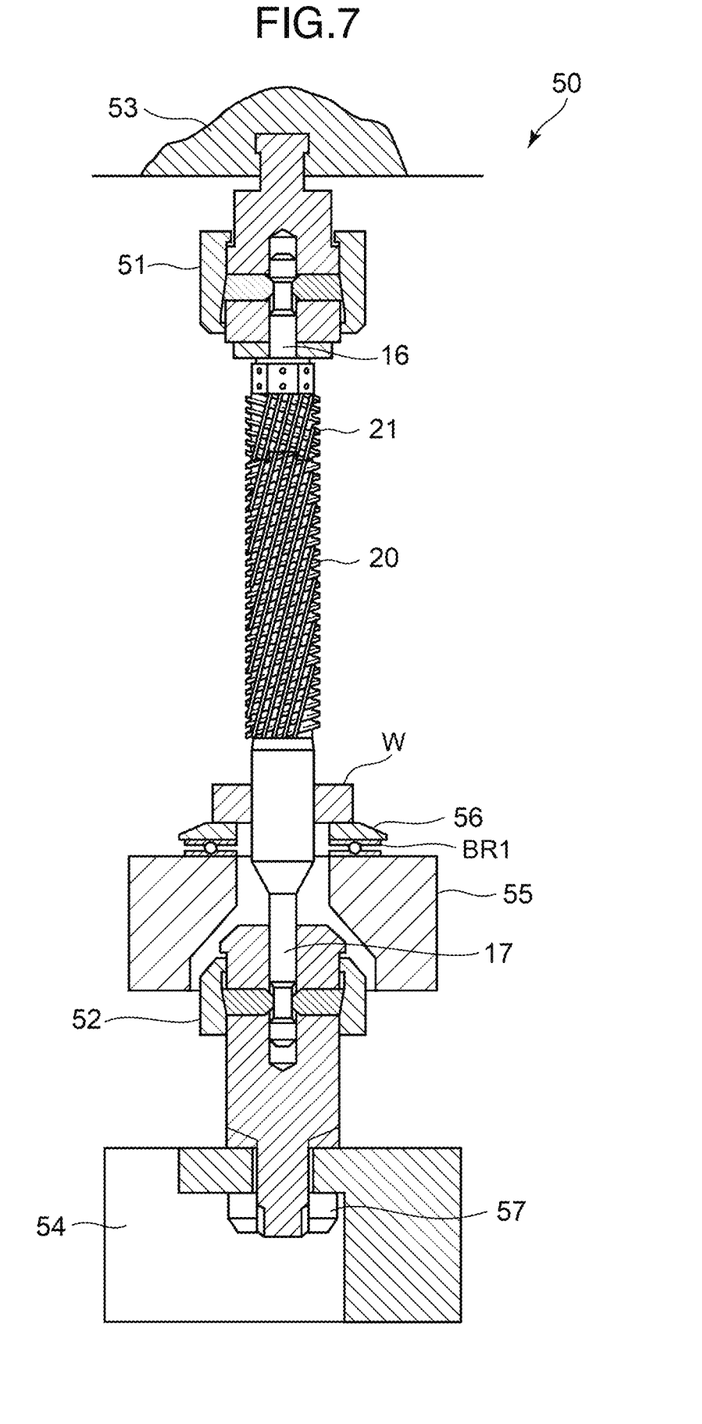
FIG. 7 is a schematic cross sectional view of a broaching machine 50, illustrating a first embodiment which performs cutting using a helical broach 20 of the present invention.

Here, a specific machining manner (internal gear machining method) in the case that broaching is performed with the helical broach of the present invention mounted on a broaching machine will be described with reference to the drawings. FIG. 7 illustrates a schematic cross sectional view of a broaching machine 50 which indicates a first embodiment in which cutting (broaching) using a helical broach 20 of the present invention is performed, and FIG. 8 illustrates a schematic cross sectional view of the broaching machine 50 which indicates a second embodiment.

Figure 8:
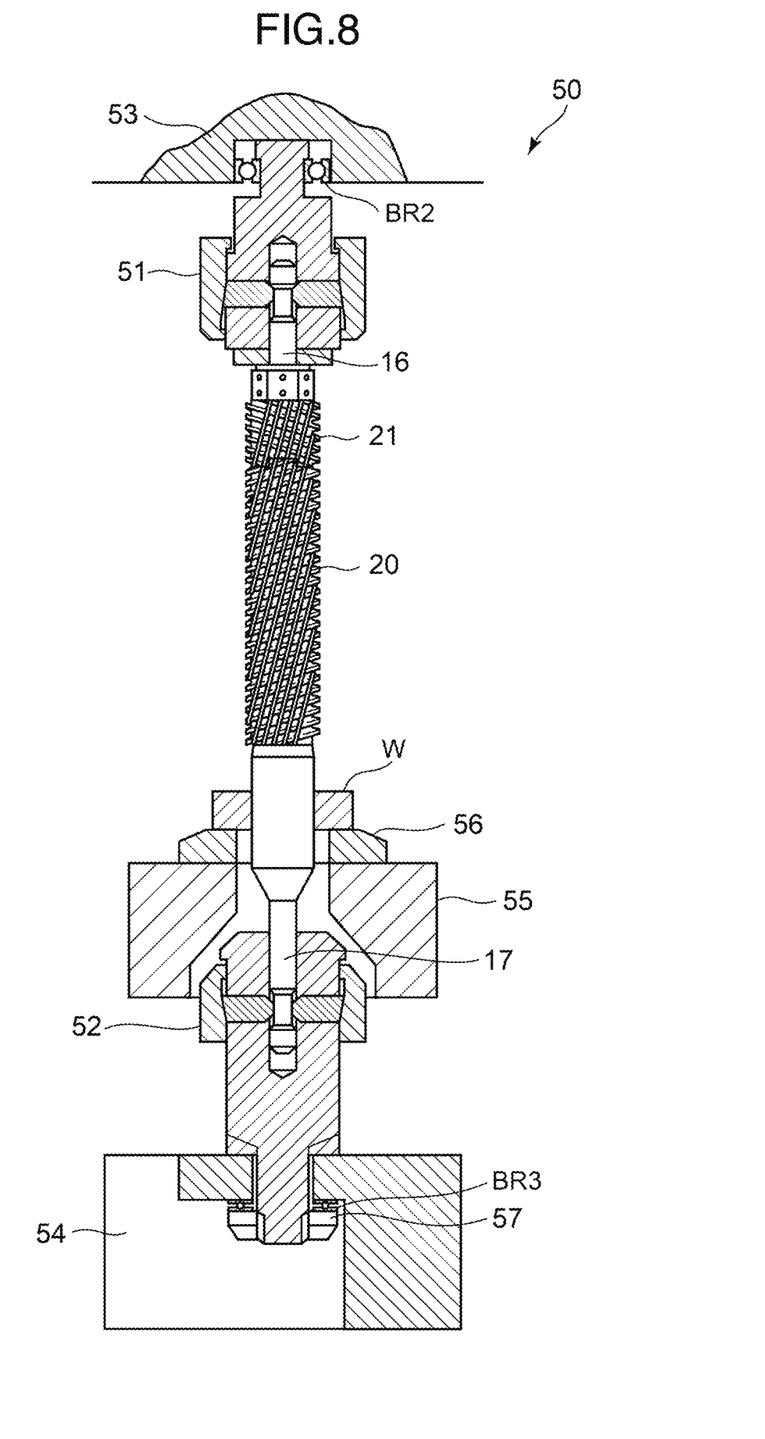
FIG. 8 is a schematic cross sectional view of the broaching machine 50, illustrating a second embodiment which performs cutting using the helical broach 20 of the present invention.

Although the helical broach 20 of the present invention illustrated in FIG. 7 and FIG. 8 presents a case where a helical broach including a detachable shell edge 21 is used, the helical broach to be used is not limited to this form.

In the first embodiment illustrated in FIG. 7, grip ends 16, 17 of the helical broach 20 of the present invention are fixed by chucks 51, 52 of the broaching machine 50. The chucks 51, 52 are supported by supporters 53, 54 of the broaching machine 50. In particular, the supporter 54 on the lower side and the chuck 52 on the lower side are mutually engaged with a screw by a stopper 57. Further, the workpiece W, on which broaching is performed by the helical broach 20, is fixed via a pressing jig 56 on a table 55 of the broaching machine 50. In this embodiment, a bearing BR1 is inserted between the table 55 and the pressing jig 56, and the table 55 and the pressing jig 56 serve as a holder of the workpiece W.

By adopting this structure, a thrust load generated in the workpiece W during broaching by the helical broach 20 becomes received by the bearing BR1. Therefore, machining can be performed in a state where the workpiece W to be machined by the helical broach 20 is freely rotatable relatively to the central axis of the helical broach 20.

The basic structure of the broaching machine 50 indicating the second embodiment illustrated in FIG. 8 is substantially the same as the structure illustrated in FIG. 7. In this embodiment, a case is illustrated in which the bearings illustrated in FIG. 7 are inserted between the chuck 51 and the supporter 53 as well as between the chuck 52 and the supporter 54 of the broaching machine 50. Specifically, in the second embodiment illustrated in FIG. 8, a bearing BR2 is installed between the chuck 51 on the upper side and the supporter 53 on the upper side, and a bearing BR3 is installed between the chuck 52 on the lower side and the supporter 54 on the lower side. In this case, the chucks 51, 52 and the supporters 53, 54 of the broaching machine 50 each serve as a holder of the helical broach 20.

Similarly to the first embodiment, in the second embodiment, a rotational force generated in the helical broach 20 during broaching using the helical broach 20 illustrated in FIG. 8 is received by those bearings BR2, BR3, and thus machining is performed in a state where the helical broach itself is freely rotatable relatively to the central axis.

Example 1

A cutting test was conducted to observe the change in the transverse force component and the main force component generated in a cutting tool by changing the above-mentioned angle θ under the conditions below. The result of the test will be described with reference to the drawings. In the cutting test, the angle θ illustrated in FIG. 5 is changed in a range from 5° to 40° in a cutting tool for testing having one cutting edge, and thus a corresponding cutting tool for testing was manufactured. By conducting a cutting test under the test conditions listed below, the ratio of the transverse force component to the main force component described above was determined. Table 1 and 2 illustrate the cutting test conditions, and FIG. 9 to FIG. 11 each illustrate a cutting test result.

It is to be noted that the following test result indicates the ratio of the transverse force component to the main force component of the cutting tool for testing, and the ratio has almost no variation unless machinability of the workpiece is significantly varied. For instance, as long as the workpiece is made of a ferrous material, the later-described test result does not change significantly.

TABLE 1

| | |
|---|---|
| RELIEF ANGLE | 2° |
| RAKE ANGLE | 15°, 18°, 21° |
| ANGLE θ (= α + β) | 5°, 15°, 20°, 25°, 30°, 35°, 40° |
| EDGE WIDTH | 5 mm |
| MATERIAL | HIGH-SPEED TOOL STEEL MADE FROM POWDER |
| SURFACE TREATMENT | TiN (TITANIUM NITRIDE) COATING |

TABLE 2

| | | | |
|---|---|---|---|
| USED MACHINE | TRIAXIAL MACHINING CENTER | | |
| WORKPIECE MATERIAL | SCM420H (CHROME MOLYBDENUM STEEL) | | |
| CUTTING OIL | OIL-BASED CUTTING OIL | | |
| CUTTING SPEED | 7 m/min | | |
| CUTTING AMOUNT [mm] | 0.03 | 0.05 | 0.07 |
| NUMBER OF PASSES | 17 | 10 | 7 |
| DEPTH OF GROOVE [mm] | 0.51 | 0.50 | 0.49 |

Figure 9:
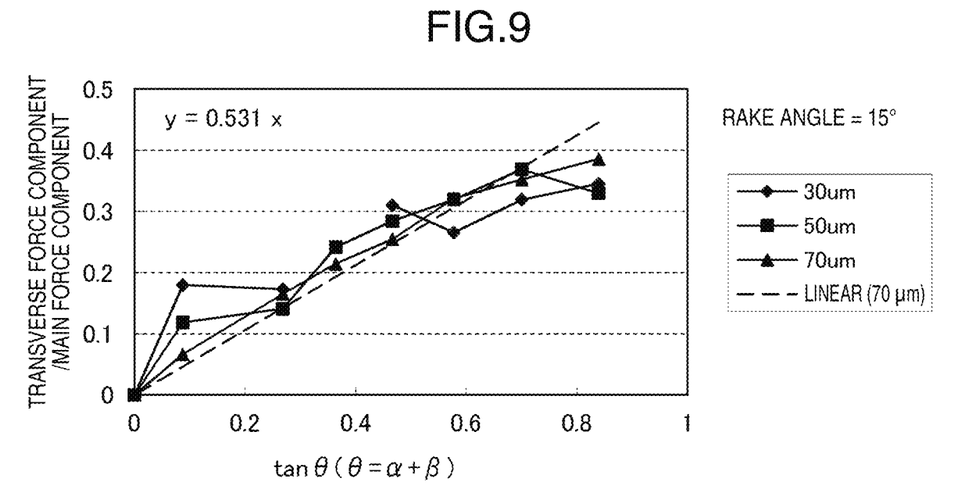
FIG. 9 is a graph in which the relationship between an angle tan θ and transverse force component/main force component is plotted in the case that a cutting test is conducted in Example 1 under the condition that a rake angle of the cutting edge=15°.

FIG. 9 is a graph which plots the relationship between an angle θ and transverse force component/main force component as a result of the cutting test which was conducted under the condition that the rake angle of the cutting edge of the cutting tool for testing=15°. The horizontal axis of the graph indicates the value of tan θ for the angle θ (=α+β), and the vertical axis indicates the value of transverse force component/main force component. The cutting test was conducted by changing the angle θ to seven levels in total of 5°, 15°, 20°, 25°, 30°, 35°, and 40°.

In addition, the cutting test was conducted by changing the depth of cut of the cutting edge to the workpiece at the time of cutting to three levels in total of 30 μm (0.03 mm), 50 μm (0.05 mm), and 70 μm (0.07 mm). It can be seen from the result of the test that the value of transverse force component/main force component can be approximated to 0.531 times the value of tan θ as illustrated in FIG. 9 under the condition that the rake angle of the cutting edge=15°. It is to be noted that the dashed line illustrated in FIG. 9 indicates the test result with a depth of cut of the cutting edge of 70 μm as a linear equation (first degree equation).

Figure 10:
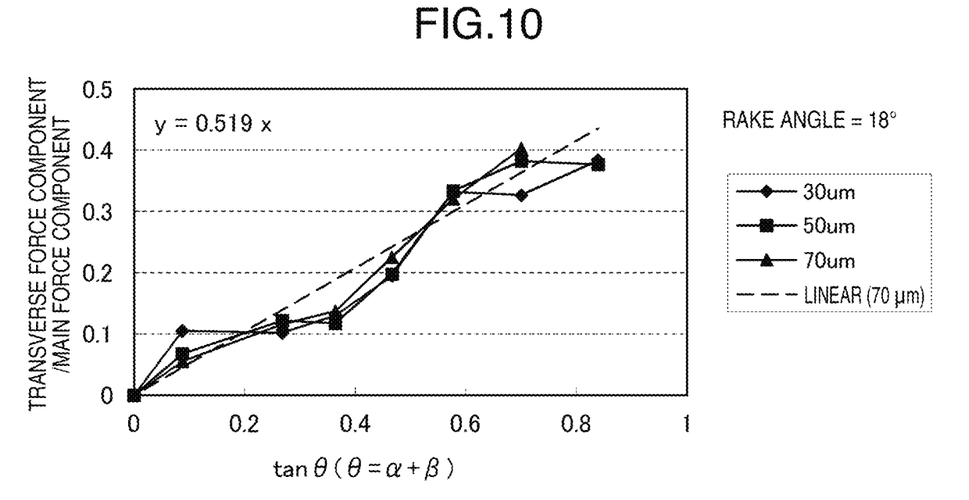
FIG. 10 is a graph in which the relationship between an angle tan θ and transverse force component/main force component is plotted in the case that a cutting test is conducted in Example 1 under the condition that a rake angle of the cutting edge=18°.

FIG. 10 is a graph which plots the relationship between an angle θ and transverse force component/main force component as a result of the cutting test which was conducted under the condition that the rake angle of the cutting edge=18°. The horizontal axis of the graph indicates the value of tan θ for the angle θ, and the vertical axis indicates the value of transverse force component/main force component. The cutting test was conducted by changing the angle θ changed to seven levels in total of 5°, 15°, 20°, 25°, 30°, 35°, and 40°.

In addition, the cutting test was conducted by changing the depth of cut to the workpiece at the time of cutting to three levels in total of 30 μm, 50 μm, and 70 μm. It can be seen from the result of the test that the value of transverse force component/main force component can be approximated to 0.519 times the value of tan θ as illustrated in FIG. 10 under the condition that the rake angle of the cutting edge=18°. It is to be noted that the dashed line illustrated in FIG. 10 indicates the test result with a depth of cut of the cutting edge of 70 μm as a linear equation (first degree equation).

Figure 11:
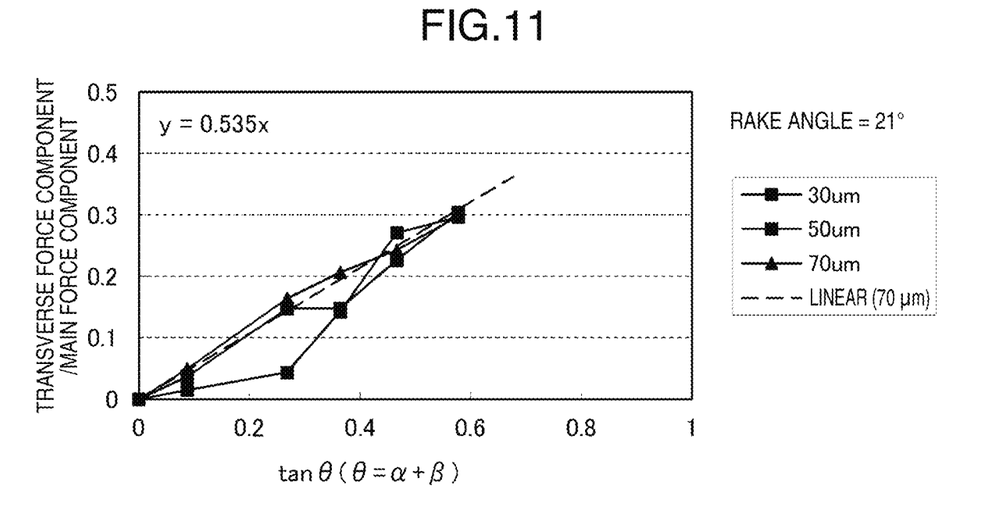
FIG. 11 is a graph in which the relationship between an angle tan θ and transverse force component/main force component is plotted in the case that a cutting test is conducted in Example 1 under the condition that a rake angle of the cutting edge=21°.

FIG. 11 is a graph which plots the relationship between an angle tan θ and transverse force component/main force component as a result of the cutting test which was conducted under the condition that the rake angle of the cutting edge=21°, and the horizontal axis of the graph indicates the value of tan θ for the angle θ, and the vertical axis indicates the value of transverse force component/main force component. In the cutting test, the angle θ was changed to seven levels in total of 5°, 15°, 20°, 25°, 30°, 35°, and 40°.

In addition, the cutting test was conducted by changing the depth of cut to the workpiece at the time of cutting to three levels in total of 30 μm, 50 μm, and 70 μm. It can be seen from the result of the test that the value of transverse force component/main force component can be approximated to 0.535 times the value of tan θ as illustrated in FIG. 11 under the condition that the rake angle of the cutting edge=21°. It is to be noted that the dashed line illustrated in FIG. 11 indicates the test result with a depth of cut of the cutting edge of 70 μm as a linear equation (first degree equation).

From the test results above, as illustrated in FIGS. 9 to 11, the test results did not change significantly even when the depth of cut to the workpiece or the rake angle of the cutting edge at the time of the cutting test was changed. Further, it has been demonstrated that in the range of angle θ≤40°, the test results almost correspond to the first degree equation below.

$$\text{Transverse Force Component/Main Force Component} = k \times \tan\theta \, (0.5 \leq k \leq 0.56) \quad (3)$$

It is to be noted that in the case of transverse force component/main force component=f(θ), it is obvious that f(−θ)=−f(θ) due to the symmetric property of the system, and therefore detailed study in the case of an angle θ<0° will be omitted.

Here, from above Expression (2) and Expression (3), when the rotational force=0, $$\tan\beta = k \times \tan\theta = k \times \tan(\alpha+\beta) \quad (4)$$

When 0.5≤tan β/tan(α+β)≤0.56, the rotational force becomes minimum.

Figure 12:
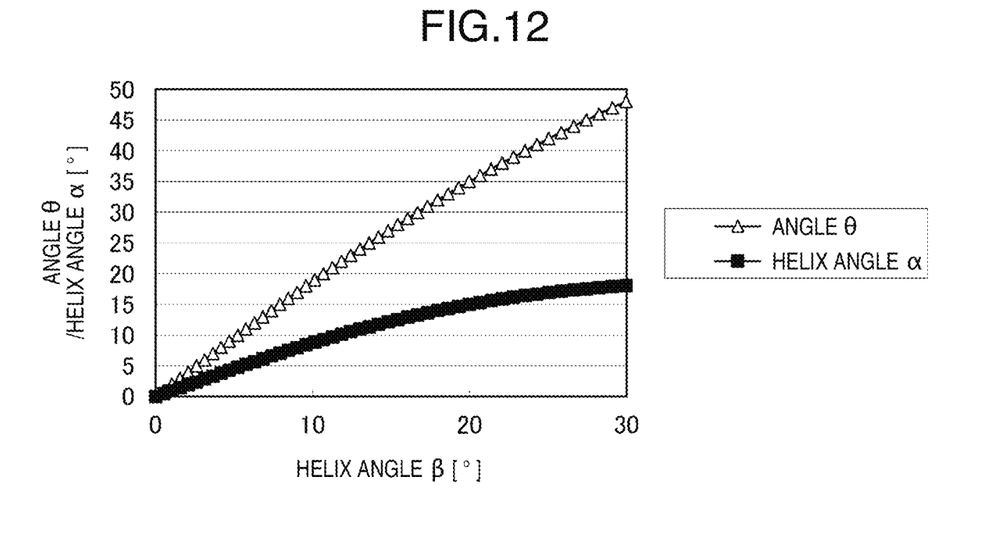
FIG. 12 is a graph showing the relationship between a helix angle β of a spiral flute of the cutting edge, and an angle θ and a helix angle α in the case of k=0.52 (tan β/tan(α+β)=0.52) in Example 1.

FIG. 12 is a graph illustrating the relationship between the helix angle β of the spiral flute of the helical broach, and the angle θ and angle α in the case of the rotational force=0 where k=0.52, that is, tan β/tan(α+β)=0.52. As illustrated in FIG. 12, for instance, when the helix angle β=20°, as the designed value for setting the rotational force=0, the angle θ=35°, and the helix angle α=15° are obtained.

In contrast, in the helical broach of the present invention, the expression: 0.5≤tan β/tan(α+β)≤0.7 is satisfied. In this case, when the value of tan β/tan(α+β) is greater than 0.5, the rotational force is not 0. However, this is because when the value is less than 0.7, the value indicates a low value to some extent, and thus machining with a weak clamp is sufficiently possible in synchronous machining of the helical broach and the workpiece.

Here, in the case of the helix angle α=0, that is, the gullet is in a form (axially perpendicular gullet) in which the gullet is formed in a perpendicular direction to the central axis of the helical broach, the following relationships are obtained.

Transverse Force Component/Main Force Component = $k \times \tan\beta$,

Transverse Force Component = Main Force Component $\times k \times \tan\beta$,

Rotational Force = Main Force Component $\times \sin\beta$ −

Main Force Component $\times k \times \tan\beta \times \cos\beta$ =

Main Force Component $\times \sin\beta \times (1 - k)$

On the other hand, in the case of α=−β, that is, the gullet is in a form (edge perpendicular gullet) in which the gullet is formed in a perpendicular direction to the spiral flute of the helical broach, because Transverse Force Component=0, and Rotational Force (edge perpendicular)=Main Force Component$\times \sin\beta$, the rotational force of the axially perpendicular gullet is (1−k) times the rotational force of the edge perpendicular gullet, specifically, 0.45 to 0.5 times the rotational force of the edge perpendicular gullet.

In other words, according to the configuration of the helical broach of the present invention, the rotational force of the workpiece during broaching using the helical broach can be substantially 0 (zero). It is to be noted that when the rotational force of the workpiece is sufficiently small, the cutting edge itself of the helical broach serves as a guide to the workpiece, and thus machining of the inner helical gear in accordance with the designed values becomes possible.

In particular, as the depth of the spiral flute or the gullet in the helical broach becomes greater, the machining characteristics of the helical broach of cutting along a workpiece are improved, and thus the workpiece allows a rotational force to a larger extent. By utilizing the characteristics, so that the value of the helix angle α only on the front side (only of a portion which performs cutting first) of the helical broach is set to the range in the present invention and the value of the helix angle α is reduced to be closer to the helix angle of the edge perpendicular gullet at a portion rearward of the front side, it is also possible to reduce wear of an acute angle.

Example 2

Next, a cutting test was conducted using two types of helical broaches consisting of a conventional helical broach of the prior art and a helical broach of the present invention. In this Example, the difference in cutting load generated in the helical broach at the time of cutting, and the difference in rotational force and rotation amount (amount of movement in the circumferential direction) generated in a workpiece between the prior art and the present invention were compared. The results of the test will be described with reference to the drawings.

In the cutting test, a workpiece the material of which is carbon steel S35C (0.35% C) was used, so that the internal gear with the module m=1.0, and the number of teeth n=111 was machined. Further, the helical broach of the prior art (hereinafter referred to as the "prior art tool") used in the test was made so that the helix angle β of the spiral flute of the cutting edge=25°, and the helix angle α of the gullet=0° (axially perpendicular gullet). The helical broach of the present invention (hereinafter referred to as the "present invention tool") was made so that the helix angle β of the spiral flute of the cutting edge=25°, and the helix angle α of the gullet=15°.

For the broaching machine using the present invention tool, the cutting test was conducted in two cases of providing a rotation stopper mechanism for a workpiece and of not providing a rotation stopper mechanism. However, from the viewpoint of prevention of damage of the helical broach and the broaching machine, for the broaching machine using the prior art tool, the cutting test was conducted only in the case where a rotation stopper mechanism for a workpiece is provided.

Figure 13:
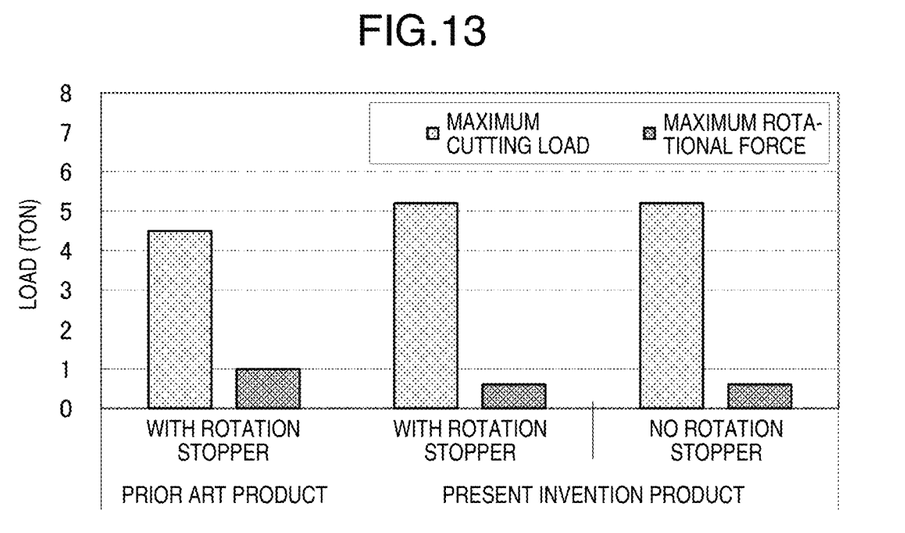
FIG. 13 is a graph showing a maximum cutting load and a maximum rotational force in a cutting test of Example 2.

FIG. 13 illustrates the measurement result of the maximum cutting load (unit: ton), and the maximum rotational force (unit: ton) at the time of the present cutting test. In the cutting test using the prior art tool, as illustrated in FIG. 13, the maximum cutting load was 4.5 tons, the maximum rotational force was 1.0 ton. In contrast, in the cutting test using the present invention tool, as illustrated in FIG. 13, the maximum cutting load was 5.2 tons, the maximum rotational force was 0.5 ton in both cases regardless of the presence of a rotation stopper mechanism for a workpiece.

Further, as a result of calculating the ratio by dividing the rotational force by the cutting load (rotational force/cutting load) on the measurement result above, the ratios were 0.2 in the case of the prior art tool and 0.1 in the case of the present invention tool. This means that in the present invention tool, even when the cutting load is increased, the effect of a force causing the workpiece to rotate during cutting is small as compared with the prior art tool.

Figure 14:
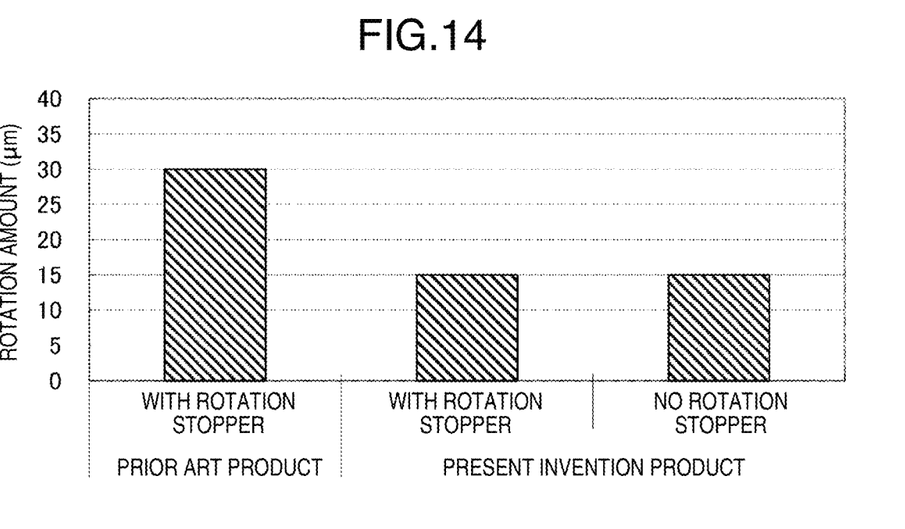
FIG. 14 is a graph showing an amount of rotation of a workpiece in the cutting test of Example 2.

Next, FIG. 14 illustrates the measurement result of the rotation amount (amount of movement in the circumferential direction) of the workpiece during the cutting test. As illustrated in FIG. 14, the rotation amount after the cutting test using the prior art tool was 30 μm even though a rotation stopper mechanism for a workpiece was provided. In contrast, the rotation amount after the cutting test using the present invention tool was 15 μm regardless of the presence of a rotation stopper mechanism for a workpiece, and the rotation amount is half of the rotation amount in the result of the cutting test using the prior art tool.

That is, in the case of the present invention tool, there is no necessity of mounting a rotation stopper mechanism for a workpiece on a broaching machine using the present invention tool because the rotation amounts of the workpiece after the cutting test are the same as one another regardless of the presence of the rotation stopper mechanism for a workpiece.

The invention claimed is:
1. A helical broach comprising a plurality of cutting edges, the helical broach further comprising:
   a spiral flute formed between adjacent cutting edges of the plurality of cutting edges to extend in a spiral manner with a predetermined helix angle with respect to an axial direction of the helical broach; and
   a gullet formed between adjacent cutting edges of the plurality of cutting edges extending in a spiral manner with a predetermined helix angle with respect to a circumferential direction of the helical broach, wherein the following expression is satisfied in the range of $\alpha+\beta \leq 40°$ $$0.5 \leq \tan\beta/\tan(\alpha+\beta) \leq 0.56$$

wherein $\beta$ is the helix angle of the spiral flute, and $(90°-\alpha)$ is the helix angle of the gullet with reference to a central axis of the helical broach.

2. A method of machining an internal gear using a broaching machine comprising the helical broach according to claim 1, wherein a holder for a workpiece machined by the helical broach in the broaching machine is provided with a bearing which receives a thrust load generated in the workpiece during machining by the helical broach, and the machining of the internal gear in the workpiece is performed by giving motion to the helical broach only in the axial direction to pull it out in a state where the helical broach and the workpiece machined by the helical broach are freely rotatable relatively to the central axis of the helical broach.

3. A method of machining an internal gear using a broaching machine comprising the helical broach according to claim 1, wherein a holder for the helical broach in the broaching machine is provided with a bearing which receives a thrust load generated in a workpiece during machining by the helical broach, and the machining of the internal gear in the workpiece is performed by giving motion to the helical broach only in the axial direction to pull it out in a state where the helical broach and the workpiece machined by the helical broach are freely rotatable relatively to the central axis of the helical broach.

\* \* \* \* \*